United States Patent [19]
Dahl-Jörgensen et al.

[11] Patent Number: 6,082,456
[45] Date of Patent: Jul. 4, 2000

[54] MEANS AND METHOD FOR THE PREPARATION OF SEALINGS IN OIL AND GAS WELLS

[75] Inventors: Einar Dahl-Jörgensen, Flataasen; Bjarte Arne Øye, Trondheim, both of Norway

[73] Assignee: Wecem AS, Randaberg, Norway

[21] Appl. No.: 09/051,799

[22] PCT Filed: Oct. 25, 1996

[86] PCT No.: PCT/NO96/00255

§ 371 Date: Apr. 23, 1998

§ 102(e) Date: Apr. 23, 1998

[87] PCT Pub. No.: WO97/15746

PCT Pub. Date: May 1, 1997

[51] Int. Cl.$^7$ .................................................. E21B 33/13
[52] U.S. Cl. ............................................ 166/295; 166/300
[58] Field of Search ..................................... 166/295, 294, 166/300, 288; 523/444, 527, 130, 131

[56] References Cited

U.S. PATENT DOCUMENTS

| | | | |
|---|---|---|---|
| 3,635,289 | 1/1972 | Van Dyk | 166/295 |
| 5,212,234 | 5/1993 | Van Grasse et al. | 525/43 |
| 5,436,396 | 7/1995 | Bailey et al. | 523/130 |

FOREIGN PATENT DOCUMENTS

| | | |
|---|---|---|
| 9412445 | 6/1994 | WIPO |

*Primary Examiner*—William Neuder
*Assistant Examiner*—Zakiya Walker
*Attorney, Agent, or Firm*—Dennison, Scheiner, Schultz & Wakeman

[57] ABSTRACT

Agent and method for establishing different types of zone sealings particularly in oil wells and gas wells, wherein the zone to be sealed is supplied with a composition comprising: monomers, an initiator for heat-induced production of free radicals, a pot life extending inhibitor for stabilization of free radicals, and optionally other additives. The composition is subjected to radical polymerization induced by heat in the well zone and at a temperature of 5–120° C., and establishes a cured mass, particularly at temperatures in the range of 65–100° C. The composition is supplied with an at least partly unsaturated prepolymer selected from the group consisting of polyester and epoxy vinylester, including one or more vinyl-containing co-monomers selected from the group consisting of styrene, vinyltoluene, 2-hydroxyethyl-methacrylate and 2-hydroxypropyl-methacrylate. The prepolymer is present in a quantity of 15–75 weight parts and the vinyl-containing co-monomers are added in a quantity of 75–15 weight parts. The composition is particularly suited for low temperature applications.

18 Claims, 6 Drawing Sheets

MEANS AND METHOD FOR THE PREPARATION OF SEALINGS IN OIL AND GAS WELLS

BACKGROUND OF THE INVENTION

The invention concerns an agent and a method for establishing different types of zone sealings in oil wells, gas wells and other well types located onshore or in the seabead, including wells in connection with exploitation of ground water.

DESCRIPTION OF RELATED ART

When sealing water producing layers or establishing the sealing of well zones, coiled tubing or interconnectable pipes are inserted, the latter also used as drill stem which can be provided with expanding sealings to shut off the casing section in the zone in question. The zone to become isolated is then supplied with a sealant which is allowed to set and hence shut off the zone.

In the case of oil wells, this is done to shut off undesirable water or gas supply, and in the case of gas wells, is done to establish a seal against water supply and to isolate polluted zones in ground water wells.

Moreover, there may be a need for sealing the annulus between the tubing and the casing in wells because of damage to the tubing caused by collapse in formation and subsequent damage to pipes.

Another type of sealing method involves a shut off plug for wells which are to be shut off permanently or temporarily, or a so-called "kick-off" plug to prepare a site for the drilling of a new well from the remaining upper section of a former well.

In the drilling of multiple branched wells there is a need to reinforce and seal the transition zones of the surrounding formation. These transition zones are subject to large mechanical stresses.

The prior art methods make use of cement. However, a disadvantage of cement is that the curing step may require up to 24 hours, which is a disproportionately long period of time, and waiting time on the production site is a very costly operation when offshore. Another disadvantage is that the strength of cured cement material in certain applications is insufficient. A further disadvantage of cement is that in view of its particle based structure the material exhibits a relatively poor penetration capability in formations, which again may result in a reduced sealing effect.

NO Patent 176878 describes a polymer-based cementing agent for use in warm zones of a well at a temperature of 120–200° C., comprising diallylphthalate (DAP), including isomers, prepolymers and/or oligomers of the same. The agent comprising the filler material among other things is polymerized by means of an initiator (organic peroxide) and prepares a cured sealing mass for different applications. A polymer based sealant of the type described in this patent has the general advantage of exhibiting relatively rapid curing after setting, contrary to cement in which the mass first sets and then cures gradually with time. The sealant of NO Patent 176878 is not applicable to well zones having more moderate temperatures, such as 5–120° C., and in many applications the curing time of the sealant will be too long and the mechanical strength of the cured mass will be too low. Another disadvantage of the unmodified DAP based polymer in such fields of application is that the cured polymer shrinks by 10–15 vol % compared to the starting composition. Therefore, the composition will have to be supplied with a shrink compensating additive in the form of a pre-dried bentonite.

SUMMARY OF THE INVENTION

The main object of the invention is to provide a polymer based sealant of the type described above for establishing different types of seals in well zones having a temperature of from 5 to 120° C., and wherein the sealant cures more rapidly, results in higher strength and reduces shrink in cured material, compared to prior art agents.

This object is achieved by an agent and a method according to the invention, where the agent according to the invention comprises a monomer, an initiator, an inhibitor and optionally a filler as well as other additives. According to the invention, the agent comprises a prepolymer in the form of an at least partially unsaturated polyester or epoxy vinylester, and moreover at least one vinyl-containing monomer.

A composition of this type can be used at far lower temperatures than prior art compositions and can achieve a sufficiently long pot life while simultaneously achieving a short curing time after initiation of the curing step. Moreover, because of its cross-linked co-polymer structure the cured mass establishes a strong and secure seal from a mechanical point of view, and maintains a desirable viscosity and pot life before initiation of the curing step. Another advantage of the present composition is that the resultant cured mass does not exhibit any volume reduction compared to the starting composition. The agent can in general be used in a temperature range of from 5 to 120° C.

The prepolymer can be selected in the form of polyester or epoxy vinylester, or a mixture of these. The composition, structure, degree of polymerization and content of double bonds in the prepolymer is not critical, but in general the composition viscosity will increase with increasing degree of polymerization of the prepolymer and with the quantity of the same in the composition. In order to obtain co-polymerization and cross-linking with the co-monomers, the prepolymer must naturally exhibit at least a certain degree of unsaturation.

The monomer used with the present invention comprises in general vinyl groups. Examples of such compounds are styrene, vinyl toluene, 2-hydroxyethyl-methacrylate, 2-hydroxypropyl-methacrylate and diallylphthalate including isomers of the same. However, styrene has two disadvantages, first, the compound exhibits a low flash point, and the compound will not fulfill the security requirement with regard to handling and storage offshore (flash point above 55° C.) if present in a sufficiently large quantity, and second, styrene has a pronounced smell and smells even at very low concentrations. For this reason it is preferred to use vinyl toluene, acrylate compounds and DAP, alone or in combination.

Examples of commercially available compositions of prepolymers and monomers applicable in the present context are Norpol 68-00 DAP comprising 40% polyester prepolymer and 60% diallylphthalate; and Norpol 47-00 comprising 50% polyester prepolymer, 50% vinyl toluene and 50% 2-hydroxypropyl methacrylate, both from Jotun AS in Sandeford, Norway.

The vinyl-containing monomer is typically present in a total quantity of not more than 75 weight parts, whereas the prepolymer typically is present in a total quantity of not more than 75 weight parts, and the total weight of prepolymer and monomer constitutes 100 weight parts. The quantity of initiator and inhibitor is adapted to the application in question, but in general the quantity of initiator will constitute from 0.5 to 3 weight parts and the inhibitor 0.05–1.5 weight parts.

The type of initiator and inhibitor is not critical and can be selected from materials that are normally used with radical polymerization. An example of a preferred inhibitor is parabenzoquinone, which exhibits the proper efficiency at elevated temperatures contrary to other inhibitors which often have poor efficiency at elevated temperatures. Other examples of inhibitors are hydroquinones, which by intense agitation will react with dispersed oxygen to form quinones. The quantity of the inhibitor is adapted to the prepolymer and monomer components in question including the desired pot life and curing time. In general the inhibitor is present in a quantity of from 0.02 to 2 weight parts, wherein the preferred quantity is 0.05 weight parts resulting in a proper exothermic process and a short curing time.

Organic peroxides can be used as the initiator, such as benzoyl peroxide (such as Akzo Cadox 40E), t-butyl-peroxy-3,3,5-trimethylhexanoate (for example Akzo Trigonox 42S), t-butyl-cumylperioxide (for example Akzo Trigonox T) and di t-butylperoxide (for example Akzo Trogonox B). The quantity of initiator in the composition is also adapted to the actual field of use, but in general the initiator quantity in the composition will be within the range 0.1–5 weight parts.

In use, the agent will be provided as a two-component composition, wherein the first component comprises for example the monomer and inhibitor and the second comprises the initiator. The quantity of the components therein is not critical as long as the respective monomers are not subjected to any self-polymerization of significance during transportation and storage.

If required, the composition can be supplied with known additives such as consistency controlling agents and weight materials.

Moreover, the composition can be supplied with a filler material comprising an inert solid material in order to reduce composition shrink during the curing process. The filler material increases the applicability of the composition during the curing step to a more bulky continuous phase compared to penetration and curing in porous formations in which any shrink in the cured polymer is not critical.

The size of the solid inert filler material may be varied within wide limits dependent on the properties of the composition and its field of use. For example the size may be from a few micrometers to 1 mm, but typically 4–50 $\mu$m. In general a larger diameter may result in a risk of sedimentation of filler material in the composition before curing, and a smaller diameter may result in an increased viscosity up to an unacceptable level.

There are no specific requirements as to the type of material, but in general the filler material must be compatible with the field of use of the polymer, particularly curing temperature and operating temperature. It should also exhibit sufficient rigidity, for example 50–100 MPa, and it must be chemically inert. A preferred material for use as filler material is glass or glass-containing materials. The filler material typically constitutes 30–40 w % of the composition.

The geometry of the filler material may also be varied within wide limits, but in view of viscosity and handling we have found that generally spherical particles are preferred since this geometry will reduce the composition viscosity and accordingly increase its ease of handling compared to, for example, fibrous filler materials.

If the composition is filled with spherical glass beads, for example, the composition will obtain optimum Theological properties, and at the same time a polymer supplied with a shrink compensating agent containing PVAc can also be used for permanent plugging of wells by filling the production casing. The same type of filled polymer may also be used as reinforcement for transition areas in multi-branched wells. The advantage of this compared to cement is that the formation is penetrated and sealed combined with an increased resistance to cracking. The filled polymer is also applicable as a packer elements instead of the mud and cement commonly used today. The advantage of using thermoset plastic above cement is that the curing procedure can be limited to the packer element only, which is impossible with cement. Excess cement will also cure/harden outside the packers. The disadvantage of mud is that the packer may lose its sealing effect with time, due to deformation of the packer element. Another advantage of this embodiment is shrink compensation in the cured material at temperatures down to 45° C.

Table 1 below shows examples of compositions of different blend alternatives according to the invention. The mutual quantity relations may vary within wide limits, particularly in view of required viscosity, flash point and curing time as a function of temperature in the well and time required for pumping. The blend values below should therefore be interpreted as instructive.

TABLE 1

Composition alternatives according to the invention
All values are in weight parts

| | Composition | | | | | | |
|---|---|---|---|---|---|---|---|
| | A | B | C | D | E | F | G |
| Polyester | 40 | 50 | 50 | 50 | 50 | 50 | |
| Vinylester | | | | | | | 50 |
| DAP* | 60 | | 25 | 25 | | | 25 |
| Vinyltoluene | | 50 | 25 | | | | 25 |
| Styrene | | | | 25 | | | |
| HPMA** | | | | | 50 | | |
| HEMA*** | | | | | | 50 | |
| Inhibitor | 0.05–0.60 | 0.05–0.60 | 0.05–0.60 | 0.05–0.60 | 0.05–0.60 | 0.05–0.60 | 0.05–0.60 |
| Initiator | 1 | 1 | 1 | 1 | 1 | 1 | 1 |

*= Diallylphalate
**= 2-hydroxypropyl-methacrylate
***= 2-hydroxyethyl-methacrylate

BRIEF DESCRIPTION OF THE DRAWINGS

In the following, the invention is described by means of examples in order to illustrate some of the technical improvements achieved by the present composition compared to the prior art and by means of graphs, in which.

DESCRIPTION OF THE PREFERRED EMBODIMENTS

EXAMPLES

Two different sealant compositions were prepared having a component composition substantially like Composition C in Table 1 above, including prior art compositions according to NO Patent 176878. Compositions according to the invention are stated in Example 1 and 2, whereas the prior art reference compositions are stated in Example 3 and 4. The compositions were prepared as identical as possible in order provide a best possible comparison of the compositions.

For simplicity the experiments were performed at atmospheric pressure, but a similar effect is proved also at real elevated pressures.

Example 1
Preparation of polyester resin according to the invention with benzoyl peroxide.

Figure 1:
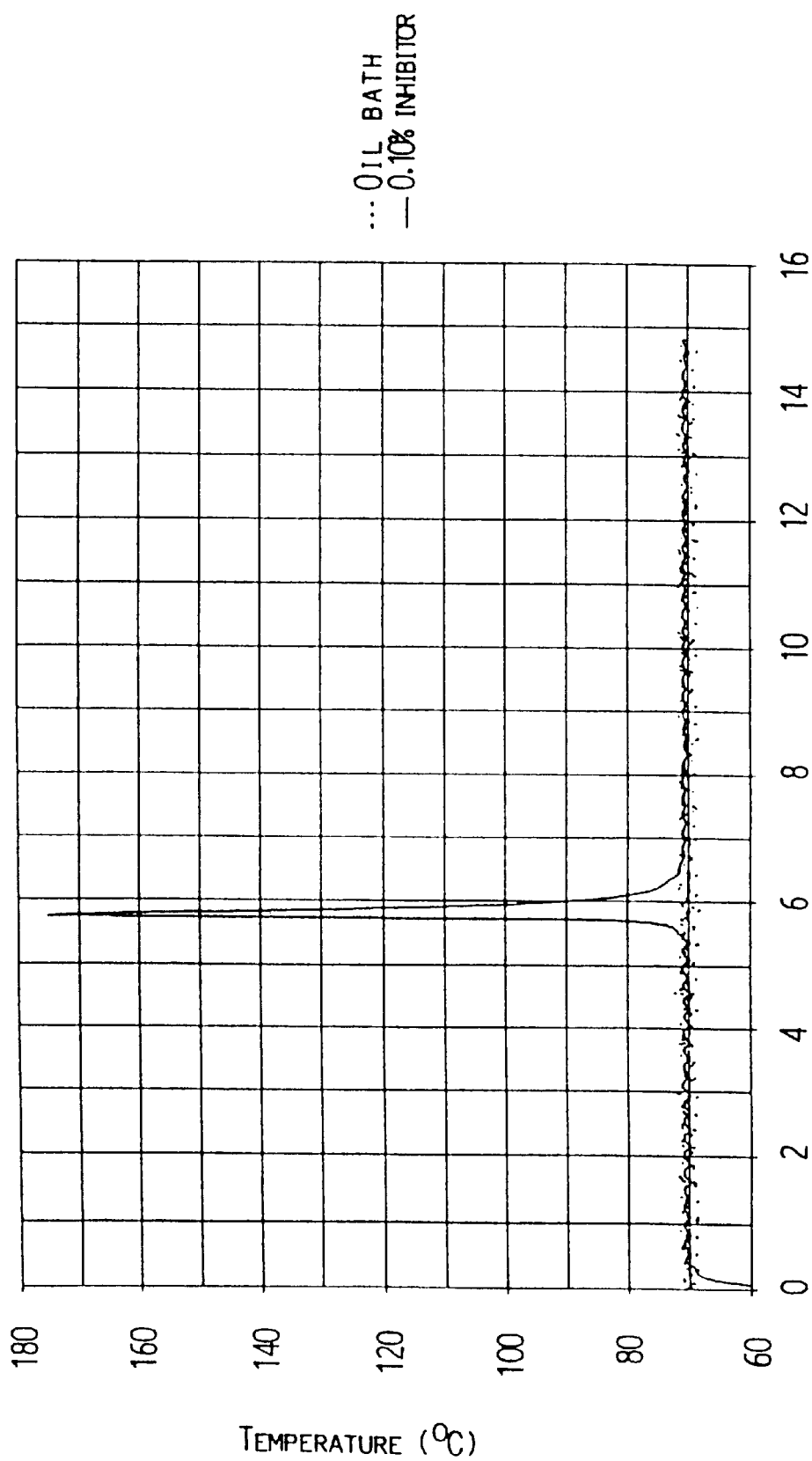
FIG. 1 shows temperature as a function of time recorded during curing of a polyester resin according to Example 1 cured at 70 ° C.

A resin was prepared from 50 g 100% polyester polymer, 25 g vinyltoluene, 25 g diallylphthalate, 1 g benzoylperoxide and 0.10 g para-benzoquinone. The homogenous liquid was transferred to a 25 ml graduated flask, which was located in a bath of silicon oil having a constant temperature of 70° C. The temperature was recorded with time both in the resin and the bath. The curing was performed at atmospheric pressure. FIG. 1 shows the temperature profile for the environments (the oil bath) and for the polyester resin cured at 70° C. The exothermal curing reaction started apparently at 305 minutes, whereas the curing peak appeared after 325 minutes with an exotherm of 106° C.

Figure 2:
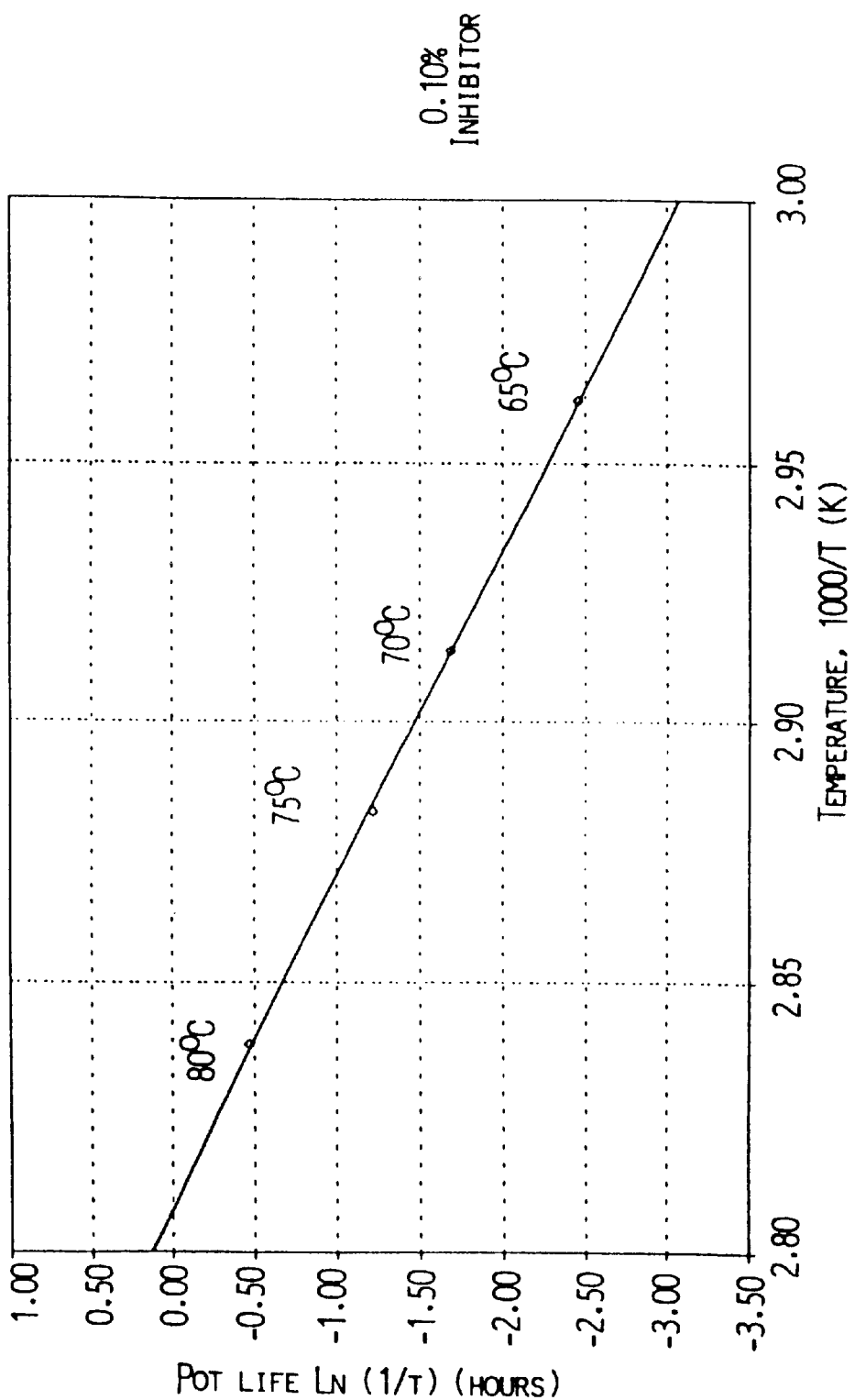
FIG. 2 is an Arrhenius plot showing open time or "pot life" for a polyester prepared according to Example 1 as a function of temperature.

Experiments identical with the former experiment were performed at constant background temperatures of 65, 70, 75 and 80° C., respectively. According to the kinetics, the ratio between the natural logarithm of the inverse of the open time (pot life), $\ln(1/t)$, and the inverse of the absolute temperature (T) in °K., $1/T$, should be linear. From FIG. 2 it is evident that a linear relationship is present, and this graph reproduces the linear relationship between open time (t) and temperature (T) of the polyester resin. Accordingly, such linear relationships can be used to obtain by interpolation the open time of a specific resin at a predetermined temperature.

Parallel compositions were prepared having an inhibitor concentration of 0.05, 0.10 and 0.20 wt % at each temperature level. The result from these experiments are summarized in Table 2 below, which shows the resulting curing time, exothermity and curing result.

Figure 3:
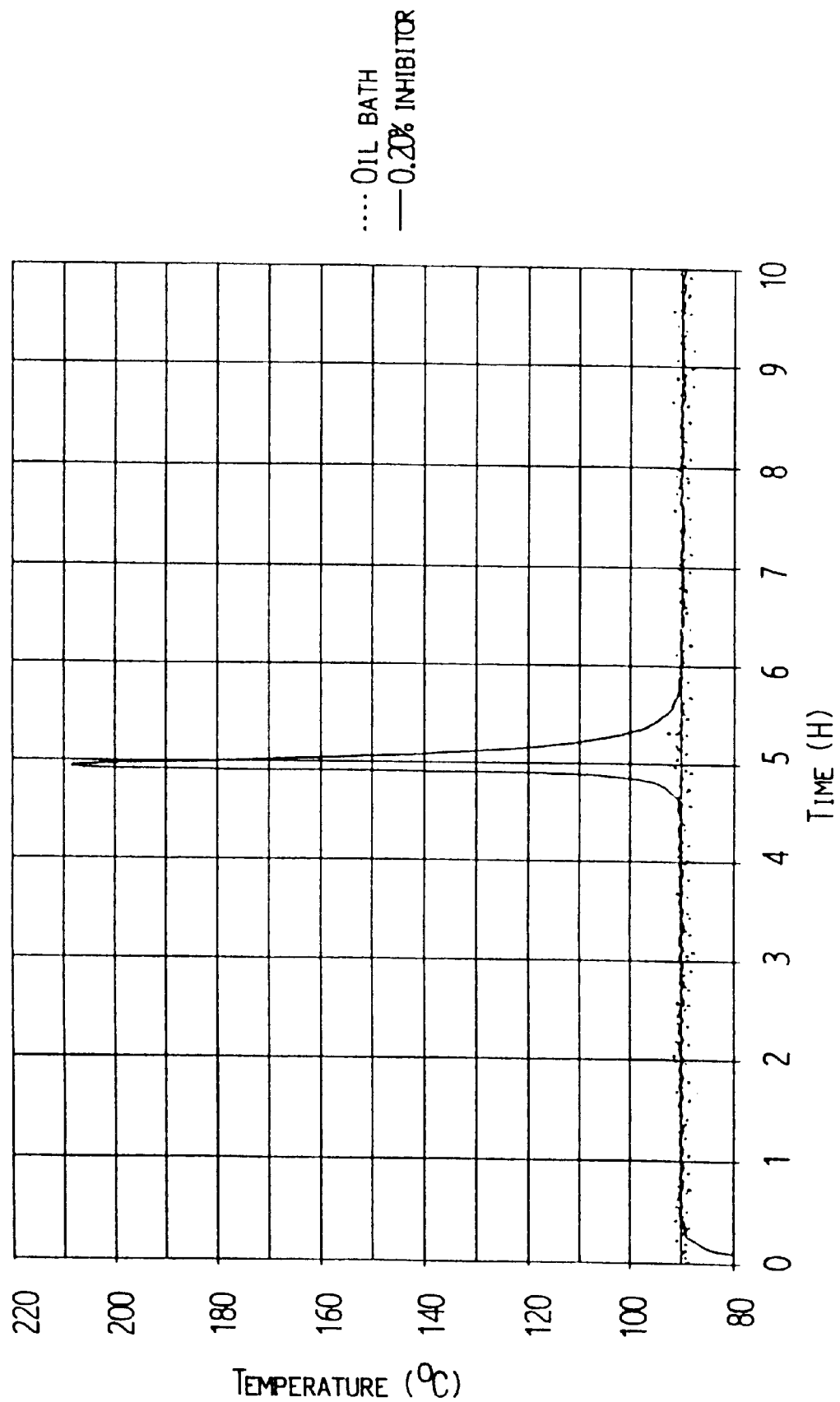
FIG. 3 shows temperature as a function of time recorded during curing of a polyester resin according to Example 2 cured at 90° C.

Example 2
Preparation of polyester resin according to the invention by using peroxy-3,3,5-trimethylhexanoate A resin was prepared from 50 g 100% polyester prepolymer, 25 g vinyltoluene, 25 g diallylphthalate, 1 g tert-butyl peroxy-3,3,5-trimethylhexanoate and 0.20 g para-benzoquinone. The homogenous liquid was transferred to a 25 ml graduated flask, which again was placed in a bath of silicon oil having a constant temperature of 90° C. The temperature of both the resin and the bath were recorded against time. The curing was performed at atmospheric pressure. FIG. 3 shows the temperature profile of the environments (the oil bath) and of the polyester resin cured at 90° C. The exothermal curing reaction apparently started at 260 minutes and the curing peak appeared after 276 minutes with an exotherm of 118° C.

Figure 4:
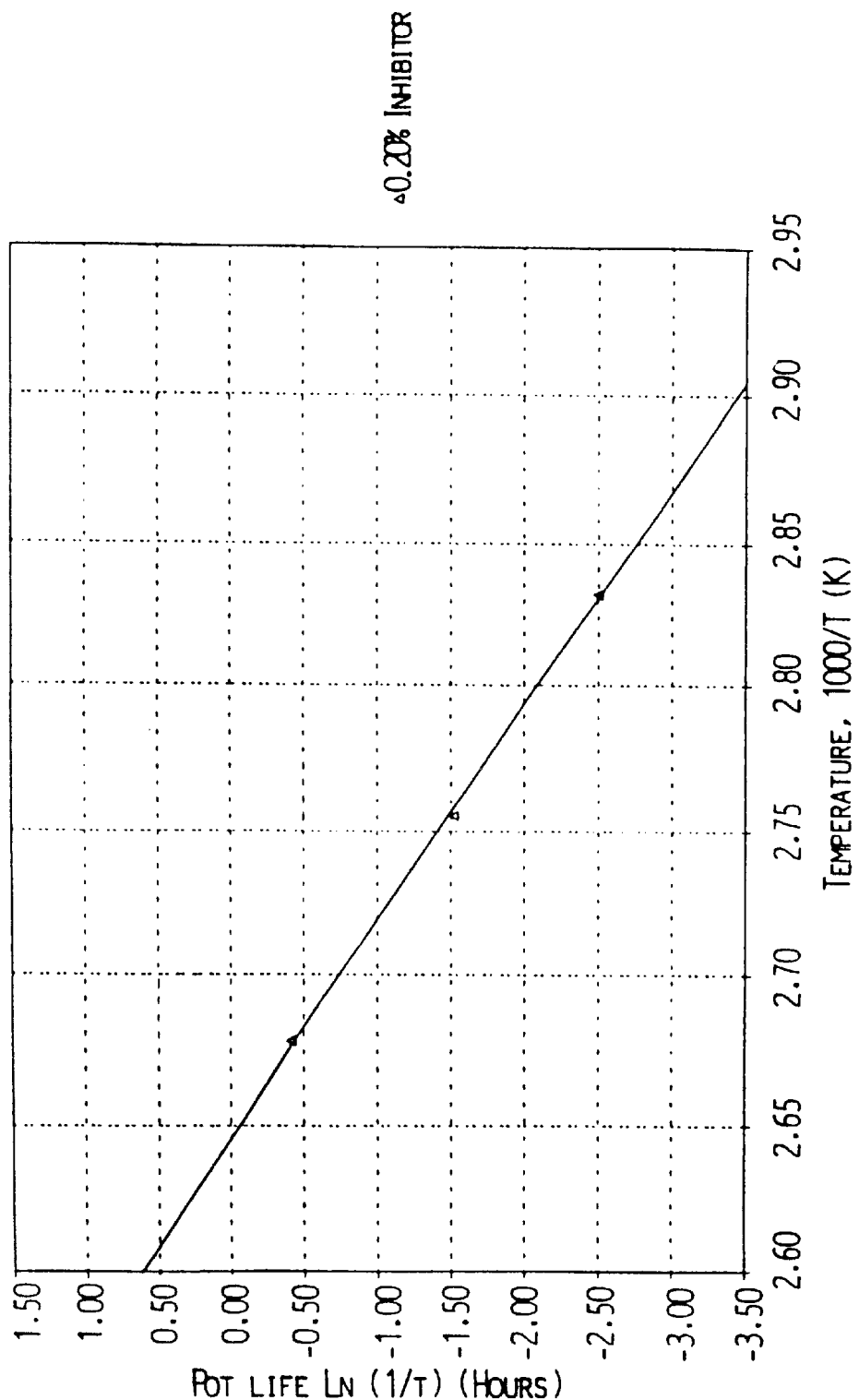
FIG. 4 is an Arrhenius plot showing open time or "pot life" for a polyester prepared according to Example 2 as a function of temperature.

Experiments identical with the former experiment were performed at constant background temperatures of 71, 80, 90 and 100° C., respectively. According to the kinetics, the ration between the natural logarithm of the inverse of the open time (pot life) (t), $\ln(1/t)$, and the inverse absolute temperature (T) in °K., $1/T$, should be linear. FIG. 4 illustrates that this is valid for the polyester resin, and the graph reproduces the linear relationship between open time (t) and the temperature (T) for the polyester resin. Accordingly, these linear relationships can be used as a determination by interpolation of open time of a specific resin at a predetermined temperature.

Four parallel compositions were prepared having an inhibitor concentration of 0.05, 0.10 and 0.20 w % at each temperature level. The result from these experiments are summarized in Table 3 below, which shows the resulting curing time, exothermity and curing result.

Reference Example 3
Preparation of a DAP resin by using benzoylperoxide.

Figure 5:
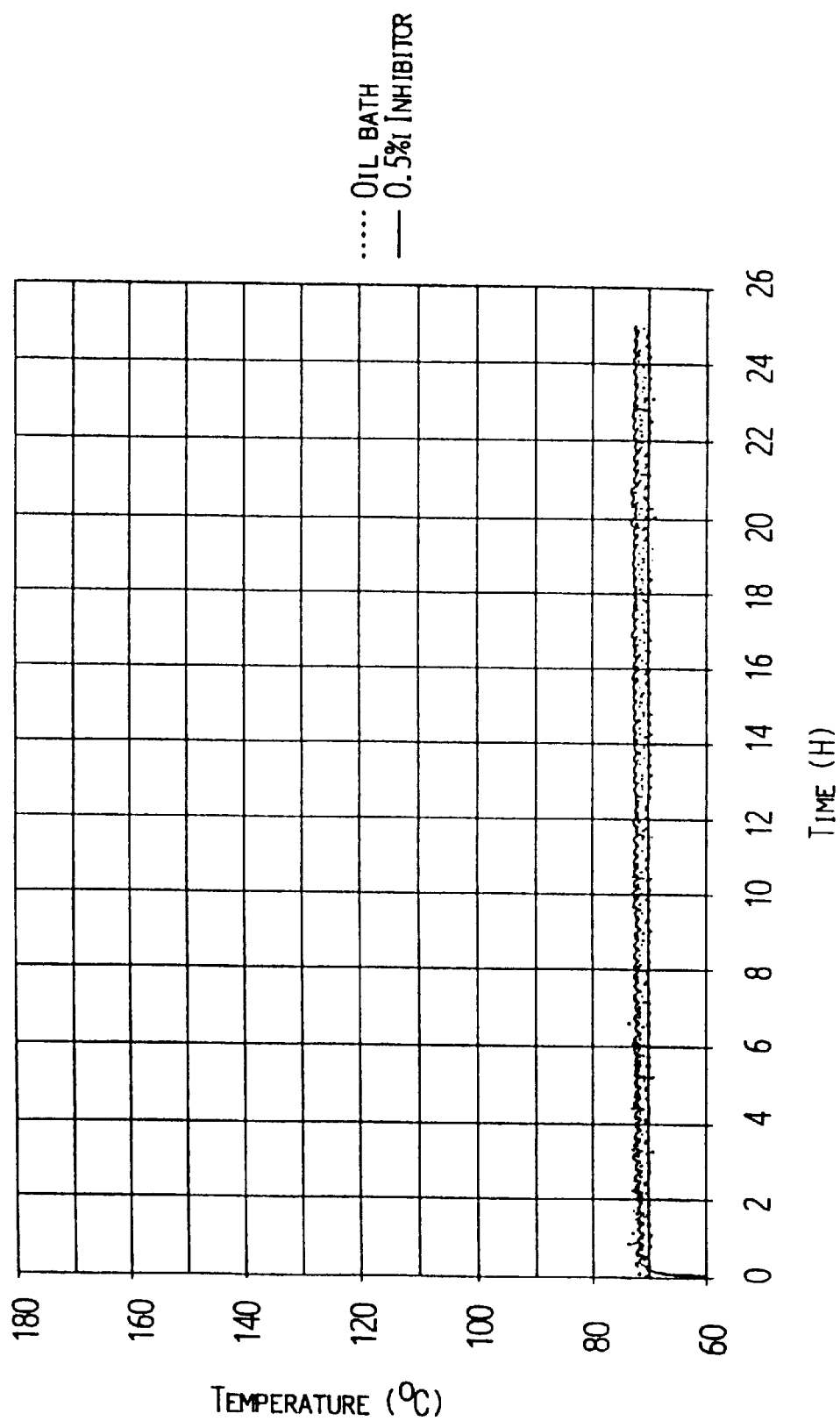
FIG. 5 shows temperature as a function of time recorded during the curing of a prior art diallylphthalate-based resin according to Example 3 cured at 70° C.

A resin was prepared from 100 g diallylphthalate, 1 g benzoylperoxide and 0.05 g para-benzoquinone. The homogenous liquid was transferred to a 25 ml graduated flask, which again was placed into a bath of silicon oil having a constant temperature of 72° C. The temperature both in the resin and the bath were recorded with time. The curing was performed at atmospheric pressure. FIG. 5 shows the temperature profile of the environments (the oil bath) and of the DAP resin at 72° C. No curing was obtained during 25 hours, and there was no exothermity.

Experiments identical with the former experiment were performed at constant background temperatures of 72, 82 and 92° C., respectively. Gelation was achieved only at 82 and 92° C., and then only at a low strength.

Parallel compositions were prepared having inhibitor concentrations of 0.05, 0.10 and 0.20 w % at each temperature level. The result from these experiments are summarized in Table 2 below, which in addition to the results from Example 1 above according to the invention shows the resulting curing time, exothermity and curing result.

Reference Example 4
Preparation of a prior art DAP resin by using peroxy-3,3,5-trimethylhexanoate.

Figure 6:
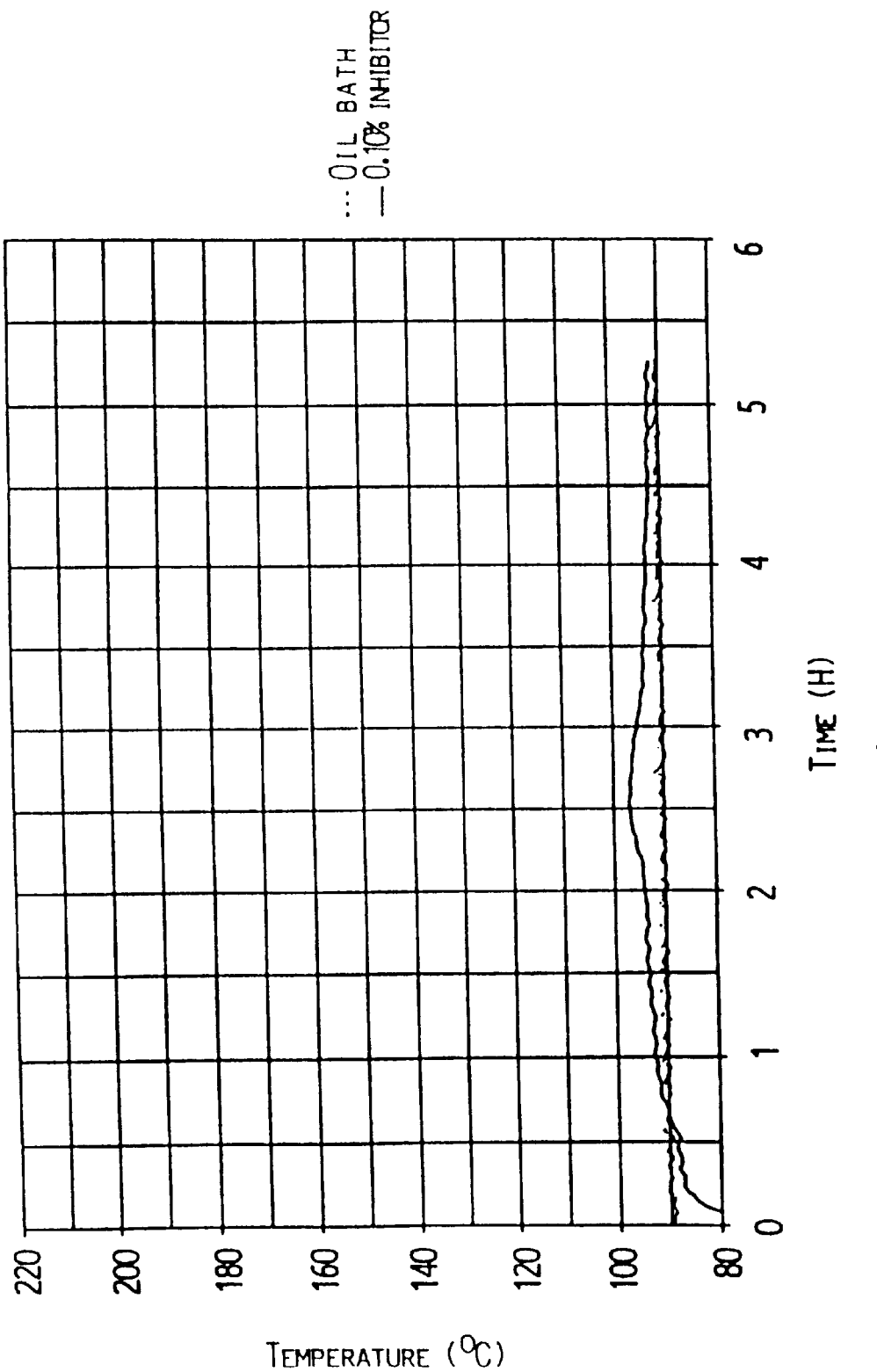
FIG. 6 shows temperature as a function of time recorded during the curing of a prior art diallylphthalate-based resin according to Example 4 cured at 90° C.

A resin was prepared from 100 g diallylphthalate, 1 g benzoylperoxide and 0.10 g para-benzoquinone. The homogenous liquid was transferred to a 25 ml graduated flask, which again was placed into a bath of silicon oil having a constant temperature of 92° C. The temperature of both the resin and the bath were recorded with time. The curing was performed at atmospheric pressure. FIG. 6 shows the temperature profile of the environments (the oil bath) and of the DAP resin at 92° C. The exothermal curing reaction started apparently at 112 minutes, whereas maximum curing appeared after 133 minutes with an exothern of 2.5° C.

Experiments identical with the former experiment were performed at constant background temperatures of 72, 82, and 92° C., respectively. Gelation was achieved only at 82 and 92° C., and then only with low strength.

Parallel compositions were prepared having inhibitor concentrations of 0.05, 0.10 and 0.20 w % at each temperature level. The result from these experiments are summarized in Table 3 below, which in addition to the results from Example 2 according to the invention show the resulting curing time, exothermity and result after curing.

TABLE 2

Curing with initiator Cadox 40E (benzoyl peroxide)

| Compound | Curing temp. [° C.] | Inhibitor quantity [%] | Curing time [h] | Exotherm [dT ° C.] | Result |
|---|---|---|---|---|---|
| Polyester/ vinyltoluene/ diallylphtalate (Example 1) | 65 | 0.05 | 5.7 | 115 | Cured |
| | | 0.10 | 11.7 | 99 | Cured |
| | | 0.20 | — | — | Not cured |
| | 70 | 0.05 | 2.6 | 118 | Cured |
| | | 0.10 | 5.4 | 106 | Cured |
| | | 0.20 | 13.0 | 81 | Cured |
| | 75 | 0.05 | 1.5 | 126 | Cured |
| | | 0.10 | 3.4 | 120 | Cured |
| | | 0.20 | 7.5 | 102 | Cured |
| | 80 | 0.05 | 0.7 | 114 | Cured |
| | | 0.10 | 1.6 | 112 | Cured |
| | | 0.20 | 3.7 | 106 | Cured |

TABLE 2-continued

Curing with initiator Cadox 40E (benzoyl peroxide)

| Compound | Curing temp. [° C.] | Inhibitor quantity [%] | Curing time [h] | Exotherm [dT ° C.] | Result |
|---|---|---|---|---|---|
| Diallylphtalate (Example 3) | 70 | 0.05 | — | ~0 | Gelled/low strength |
| | | 0.10 | — | ~0 | Gelled/low strength |
| | | 0.20 | — | ~0 | Gelled/low strength |
| | 80 | 0.05 | 5.0 | 3 | Gelled/low strength |
| | | 0.10 | 5.1 | 3 | Gelled/low strength |
| | | 0.20 | 5.1 | ~0 | Gelled/low strength |
| | 90 | 0.05 | 1.2 | 6 | Gelled/low strength |
| | | 0.10 | 2.0 | 3 | Gelled/low strength |
| | | 0.20 | 2.0 | 3 | Gelled/low strength |

TABLE 3

Curing with initiator Trigonox 42S (tert-butyl peroxy-3,3,5-trimethylhexanoate)

| Compound | Curing temp. [° C.] | Inhibitor quantity [%] | Curing time [h] | Exotherm [dT ° C.] | Result |
|---|---|---|---|---|---|
| Polyester/ vinyltoluene/ diallylphthalate (Example 2) | 70 | 0.05 | 12.5 | 20 | Cured |
| | | 0.10 | 20.3 | 10 | Cured |
| | | 0.20 | — | — | Not cured |
| | 80 | 0.05 | 4.7 | 119 | Cured |
| | | 0.10 | 7.9 | 120 | Cured |
| | | 0.20 | 12.2 | 89 | Cured |
| | | 0.40 | 17.7 | 16 | Cured |
| | | 0.60 | — | — | Not cured |
| | 90 | 0.05 | 1.6 | 121 | Cured |
| | | 0.10 | 2.9 | 122 | Cured |
| | | 0.20 | 4.6 | 118 | Cured |
| | | 0.40 | 7.2 | 84 | Cured |
| Polyester/ vinyltoluene/ diallylphthalate . . . . . . | 100 | 0.05 | 0.4 | 111 | Cured |
| | | 0.10 | 0.9 | 123 | Cured |
| | | 0.20 | 1.5 | 116 | Cured |
| | | 0.40 | 2.6 | 97 | Cured |
| | | 0.60 | — | — | Not cured |
| Diallylphthalate (Example 4) | 90 | 0.05 | 22 | ~0 | Gelled/low strength |
| | | 0.10 | — | ~0 | |
| | | 0.20 | — | ~0 | Not cured |
| | | 0.40 | — | ~0 | Not cured |
| | 100 | 0.05 | 4 | 6 | Low strength |
| | | 0.10 | 6 | 3 | Low strength |
| | | 0.20 | 10 | 3 | Low strength |
| | 110 | 0.05 | 1.5 | 40 | Low strength |
| | | 0.10 | 2 | 35 | Low strength |
| | | 0.20 | 3 | 9 | Low strength |

TABLE 3-continued

Curing with initiator Trigonox 42S (tert-butyl peroxy-3,3,5-trimethylhexanoate)

| Compound | Curing temp. [° C.] | Inhibitor quantity [%] | Curing time [h] | Exotherm [dT ° C.] | Result |
|---|---|---|---|---|---|
|  |  | 0.40 | — | ~0 | No gelation |
|  | 120 | 0.05 | 0.25 | 65 | Low strength |
|  |  | 0.10 | 0.40 | 40 | Low strength |
|  |  | 0.20 | 1.2 | 45 | Low strength |
|  |  | 0.40 | 1.8 | 5 | Low strength |

As is evident from Table 2 and 3 above, the prior art diallylphthalate-based composition generally gelled poorly with both of the initiators used in these experiments. The strength of the cured mass is generally low. The curing heat emission is also low, and the heat production occurs at a temperature of 110–120° C. The experiments with diallylphthalate and initiator and inhibitor at identical concentrations show that there was no curing below 80° C., and the curing temperature had to be at least 110° C. before the exotherm exceeded dt=6° C. The exotherm was generally much lower: dT=8–60° C. at 120° C. and dT=6° C. in the range 80–100° C. Strength establishment does not occur simultaneously with the exotherm. At 120° C. the exotherms appeared between 0.25 and 2 hours, whereas there was no significant strength establishment after 6 hours. Curing at 100° C. produced an exotherm of a maximum of 6° C. in the range of 4–10 hours. Not until 24 hours was the strength sufficiently high to complicate withdrawal of the thermo element out from the sample.

To the contrary, the polymer based composition according to the invention exhibits an applicable temperature range of 65–100° C. with the initiators and inhibitors used. The exothermity expressed as temperature increase (dT) constitutes in general 120° C. at an inhibitor concentration of 0.05 w %, and the strength establishment occurs instantaneously. Moreover, the resulting cured mass exhibited practically no shrink, contrary to the prior art DAP based resin.

What is claimed is:

1. A curable, non-aqueous homogeneous liquid composition for sealing wells, comprising an initiator, an inhibitor, and optionally a filler, said composition further comprising an at least partially unsaturated prepolymer selected from the group consisting of polyester and epoxy-vinyl ester, and at least one vinyl-containing monomer.

2. The composition of claim 1, wherein the monomer is selected from the group consisting of styrene, vinyl toluene and acrylate compounds.

3. The composition of claim 2, wherein said acrylate compounds are selected from the group consisting of 2-hydroxy ethyl methacrylate and 2-hydroxy propyl methacrylate.

4. The composition of claim 1, wherein said prepolymer is present in an amount of not more than 75 parts by weight, the monomer is present in an amount of not more than 75parts by weight, the total weight of monomer and prepolymer is 100 parts by weight, the initiator is present in an amount of 0.1–5 parts by weight and the inhibitor is present in an amount of 0.02–2 parts by weight.

5. The composition of claim 1, wherein said filler comprises glass beads.

6. The composition of claim 1, additionally comprising diallylphthalate monomer.

7. The composition of claim 1, having a curing time in the range of 2.6 to 20.3 hours at 70° C.

8. A method for sealing a zone of a well, comprising supplying to said zone a curable non-aqueous, homogeneous liquid composition comprising an initiator for heat induced production of free radicals, a pot life extending inhibitor for stabilization of free radicals, and optionally a filler, said composition further comprising an at least partially unsaturated prepolymer selected from the group consisting of polyester and epoxy-vinyl ester, and at least one vinyl-containing monomer, and subjecting said composition to radical polymerization initiated by heat in the zone at a temperature of 5–120° C. to form a cured mass which seals the zone.

9. The method of claim 8, wherein the temperature is 65–100° C.

10. The method of claim 8, wherein the monomer is selected from the group consisting of styrene, vinyl toluene, 2-hydroxy ethyl methacrylate and 2-hydroxy propyl methacrylate.

11. The method of claim 8, wherein said prepolymer is supplied in an amount of not more than 75 parts by weight, the monomer is supplied in an amount of not more than 75 parts by weight, the total weight of monomer and prepolymer is 100 parts by weight, the initiator is supplied in an amount of 0.1–5 parts by weight and the inhibitor is supplied in an amount of 0.02–2 parts by weight.

12. The method of claim 8, wherein said filler comprises glass beads.

13. The method of claim 8, wherein the composition further comprises diallylphthalate monomer.

14. The method of claim 8, wherein the composition has a curing time in the range of 2.6 to 20.3 hours at 70° C.

15. A curable liquid composition for sealing wells, consisting essentially of:

an initiator;

an inhibitor;

optionally, a filler;

at least one at least partially unsaturated prepolymer selected from the group consisting of polyester and epoxy-vinyl ester; and at least one vinyl-containing monomer.

16. A composition according to claim 15, wherein the at least one monomer and the at least one unsaturated prepolymer together total 100 parts by weight, with the at least one monomer present in an amount of not more than 75 parts by weight and the at least one prepolymer present in an amount of not more than 75 parts by weight.

17. A method for sealing a zone of a well, comprising supplying to said zone a curable liquid composition consisting essentially of at least one vinyl-containing monomer, an initiator for heat induced production of free radicals, a pot life extending inhibitor for stabilization of free radicals, optionally a filler, and at least one at least partially unsaturated prepolymer selected from the group consisting of polyester and epoxy-vinyl ester, and subjecting said composition to radical polymerization initiated by heat in the zone at a temperature of 5–120° C. to form a cured mass which seals the zone.

18. The method of claim 17, wherein the at least one monomer and the at least one unsaturated prepolymer together total 100 parts by weight, with the at least one monomer present in an amount of not more than 75 parts by weight and the at least one prepolymer present in an amount of not more than 75 parts by weight.

* * * * *